Aug. 18, 1959

E. RAWDIN 2,900,458

METHOD OF ELIMINATING SCALING ERRORS
IN ANALOG COMPUTATION

Filed Aug. 13, 1957

INVENTOR.
EUGENE RAWDIN
BY Wade Koontz
ATTORNEY and
James S. Shannon
AGENT

United States Patent Office 2,900,458

Patented Aug. 18, 1959

2,900,458

METHOD OF ELIMINATING SCALING ERRORS IN ANALOG COMPUTATION

Eugene Rawdin, Levittown, Pa., assignor to the United States of America as represented by the Secretary of the Air Force Application August 13, 1957, Serial No. 678,023

3 Claims. (Cl. 179—171)

(Granted under Title 35, U.S. Code (1952), sec. 266)

The invention described herein may be manufactured and used by or for the United States Government for governmental purposes without payment to me of any royalty thereon.

This invention relates to negative feedback amplifiers as used in analog computers and particularly those amplifiers that derive their inputs from adjustable scaling potentiometers.

Amplifiers used in analog circuits usually are supplied with sufficient negative feedback to render the gain independent of changes in supply voltage, tube characteristics, etc., so as to eliminate errors from these causes. However, if the amplifier derives its input from an adjustable potentiometer, as is often the case in scaling circuits, the input potentiometer becomes a part of the feedback path with the result that adjustment of the potentiometer varies the feedback and therefore the gain of the amplifier. It is the object of the invention to prevent errors from this source. Briefly, this is accomplished by providing an adjustable attenuating network in the feedback path that is electrically similar to the input potentiometer as it appears in the feedback path, and ganging the adjusting mechanisms so that the inserted network varies the feedback in a manner equal and opposite to the variation in feedback produced by the input potentiometer.

Figure 1:
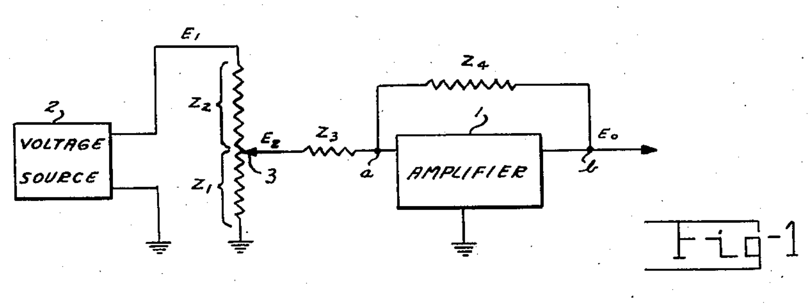
Figure 2:
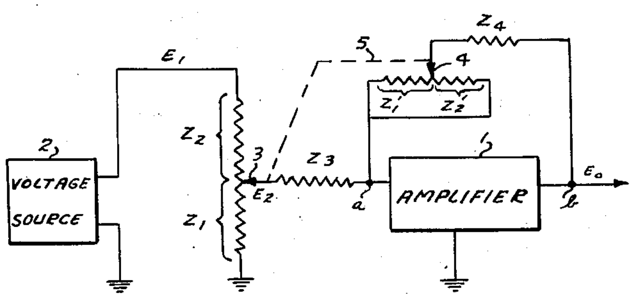
Figure 3:
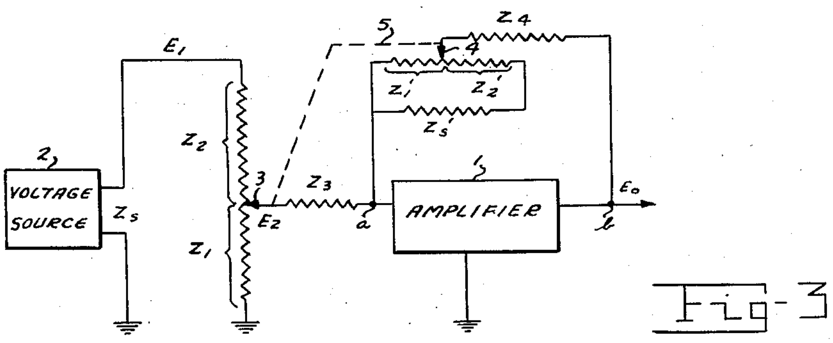

A more detailed description of the invention will be given in connection with the specific embodiments thereof shown in the accompanying drawings in which Fig. 1 shows a conventional negative feedback amplifier having an adjustable potentiometer in its input circuit, Fig. 2 illustrates the invention applied to the amplifier of Fig. 1, and Fig. 3 is a modification of Fig. 2.

As is known, the gain of an amplifier with negative feedback is expressed by the following equation:

$$G=\frac{A}{1+AB} \qquad (1)$$

where A is the amplification without feedback and B is the fraction of the amplifier output voltage negatively fed back to the input. If the product AB, the gain around the feedback loop, is made much greater than unity, the 1 in the denominator may be disregarded and the equation becomes $$G=\frac{1}{B} \qquad (2)$$

Since B is independent of such factors as tube characteristics, supply voltages, etc., changes in these factors will not affect the gain of the amplifier.

In the amplifier circuit of Fig. 1, the factor B, or the fraction of the voltage $E_0$ appearing at the output terminal *b* of amplifier 1 that is fed back to the input terminal *a* of the amplifier, assuming the internal impedance of voltage source 2 to be negligible, is $$B=\frac{Z_3+\frac{Z_1\cdot Z_2}{Z_1+Z_2}}{Z_4+Z_3+\frac{Z_1\cdot Z_2}{Z_1+Z_2}}=\frac{1}{\frac{Z_4}{Z_3+\frac{Z_1\cdot Z_2}{Z_1+Z_2}}+1} \qquad (3)$$

When contact 3 in Fig. 1 is moved along the potentiometer resistance element, the quantity $$\frac{Z_1\cdot Z_2}{Z_1+Z_2}$$

varies which, as seen from Equation 3, causes a variation in B which in turn, as seen in Equations 1 and 2, causes a variation in the gain G of the amplifier and a consequent error in $E_0$.

In accordance with the invention this error is prevented by making B a constant independent of the position of contact 3. This is accomplished by inserting an adjustable potentiometer having a resistance element $Z_1'+Z_2'$ in series with $Z_4$ in the feedback circuit as shown in Fig. 2. The value of B is now given by the expression $$B=\frac{1}{\frac{Z_4+\frac{Z_1'\cdot Z_2'}{Z_1'+Z_2'}}{Z_3+\frac{Z_1\cdot Z_2}{Z_1+Z_2}}+1} \qquad (4)$$

If $Z_1'+Z_2'$ is chosen to satisfy the equality $$Z_1'+Z_2'=\frac{Z_4}{Z_3}(Z_1+Z_2) \qquad (5)$$

and if the contacts 3 and 4 are ganged by a mechanical coupling 5 so that $$\frac{Z_1'}{Z_2'}=\frac{Z_1}{Z_2} \qquad (6)$$

then $$\frac{Z_1'\cdot Z_2'}{Z_1'+Z_2'}=\frac{Z_4}{Z_3}\cdot\frac{Z_1\cdot Z_2}{Z_1+Z_2} \qquad (7)$$

Substituting this value in Equation 4

$$B=\frac{1}{\frac{Z_4+\frac{Z_4}{Z_3}\cdot\frac{Z_1\cdot Z_2}{Z_1+Z_2}}{Z_3+\frac{Z_1\cdot Z_2}{Z_1+Z_2}}+1} \qquad (8)$$

or, simplifying (8), $$B=\frac{1}{\frac{Z_4}{Z_3}\cdot\frac{Z_3+\frac{Z_1\cdot Z_2}{Z_1+Z_2}}{Z_3+\frac{Z_1\cdot Z_2}{Z_1+Z_2+1}}}=\frac{1}{\frac{Z_4}{Z_3}+1}=\frac{Z_3}{Z_4+Z_3} \qquad (9)$$

which is a constant independent of the position of contact 3.

Therefore, substituting this value of B in Equation 1, the gain of any negative feedback amplifier employing the invention is $$(10)\qquad G=\frac{A}{1+\frac{AZ_3}{Z_4+Z_3}}$$

and if $Z_3$, $Z_4$ and A, the amplification of amplifier 1, are so chosen that the product AB or $$\frac{AZ_3}{Z_4+Z_3}$$

is much greater than unity the gain becomes, as explained for Equation 2, $$(11)\qquad G=\frac{1}{B}=\frac{Z_4}{Z_3}+1$$

In both cases the gain of the amplifier is made independent of the position of contact 3 and, in the latter case, independent of both the position of contact 3 and variations in power supply voltage, tube characteristics and other factors that may affect A.

In Fig. 2, it was assumed that the impedance of voltage source 2 was negligible in comparison with the other impedances, particularly $Z_3$. If this is not the case the internal impedance $Z_s$ of source 2 must be taken into account. This can be done by connecting an impedance $Z_s'$ in shunt to $Z_1'+Z_2'$, as shown in Fig. 3. The expression for B in this situation becomes $$(12)\qquad B=\frac{1}{\dfrac{Z_4+\dfrac{Z_1'(Z_2'+Z_s')}{Z_1'+Z_2'+Z_s'}}{Z_3+\dfrac{Z_1(Z_2+Z_s)}{Z_1+Z_2+Z_s}}+1}$$

If $Z_1'+Z_2'$ and $Z_s'$ are chosen to satisfy the equalities $$(13)\qquad Z_1'+Z_2'=\frac{Z_4}{Z_3}(Z_1+Z_2)$$

and $$(14)\qquad Z_s'=\frac{Z_4}{Z_3}Z_s$$

and if, as before, contacts 3 and 4 are ganged so that $$\frac{Z_1'}{Z_2'}=\frac{Z_1}{Z_2}$$

then $$(15)\qquad \frac{Z_1'(Z_2'+Z_s')}{Z_1'+Z_2'+Z_s'}=\frac{Z_4}{Z_3}\cdot\frac{Z_1(Z_2+Z_s)}{Z_1+Z_2+Z_s}$$

Substituting this value in Equation 12

$$(16)\qquad B=\frac{1}{\dfrac{Z_4+\dfrac{Z_4}{Z_3}\cdot\dfrac{Z_1(Z_2+Z_s)}{Z_1+Z_2+Z_s}}{Z_3+\dfrac{Z_1(Z_2+Z_s)}{Z_1+Z_2+Z_s}}+1}$$

Rearranging (16)

$$B=\frac{1}{\dfrac{Z_4}{Z_3}\cdot\dfrac{Z_3+\dfrac{Z_1(Z_2+Z_s)}{Z_1+Z_2+Z_s}}{Z_3+\dfrac{Z_1(Z_2+Z_s)}{Z_1+Z_2+Z_s}}+1}$$

from which $$B=\frac{1}{\frac{Z_4}{Z_3}+1}=\frac{Z_3}{Z_4+Z_3}$$

This is seen to agree with Equation 9 so that the expressions for amplifier gain given in Equations 10 and 11 apply.

As demonstrated above, the effect of the invention is to make B a constant and independent of the position of contact 3. In other words, the invention maintains the ratio $$\frac{Z_3+\dfrac{Z_1(Z_2+Z_s)}{Z_1+Z_2+Z_s}}{Z_4+\dfrac{Z_1'(Z_2'+Z_s')}{Z_1'+Z_2'+Z_s'}+Z_3+\dfrac{Z_1(Z_2+Z_2)}{Z_1+Z_2+Z_s}}$$

which is the definition of B, constant. From the laws of proportionality, if the above ratio is constant the ratio $$\frac{Z_4+\dfrac{Z_1'(Z_2'+Z_s')}{Z_1'+Z_2'+Z_s'}}{Z_3+\dfrac{Z_1(Z_2+Z_s)}{Z_1+Z_2+Z_s}}$$

is constant. This may be proven by substituting in the above ratio the value from Equation 15, giving the ratio $$\frac{Z_4+\dfrac{Z_4}{Z_3}\cdot\dfrac{Z_1(Z_2+Z_s)}{Z_1+Z_2+Z_s}}{Z_3+\dfrac{Z_1(Z_2+Z_s)}{Z_1+Z_2+Z_s}}$$

which reduces to the constant $$\frac{Z_4}{Z_3}$$

Therefore, from another viewpoint, the invention operates to maintain the ratio of the impedance between terminals *a*—*b* to the impedance between terminal *a* and ground constant and independent of the position of contact 3. When this condition exists, B is independent of the position of contact 3 as desired.

I claim:

1. An amplifier having an input terminal, an output terminal and a common terminal; a signal level adjusting potentiometer comprising a first impedance element and an adjustable tap thereon, said first impedance element being connected across a source of signal voltage and having one end connected to said common terminal; a connection between said adjustable tap and said input terminal; a feedback circuit connected between said output and input terminals; and means for making the fraction of the voltage at said output terminal fed back to said input terminal independent of the position of said tap, said means comprising: a two-terminal network connected in said feedback circuit; said network comprising a second impedance element having an adjustable tap, said tap being connected to one network terminal, one end of said second impedance element being connected to the other network terminal, and the other end of said second impedance element being connected to said other network terminal through a third impedance proportional to the impedance of said signal source; and means for ganging the taps of said first and second impedance elements for simultaneous adjustment.

2. Apparatus as claimed in claim 1 in which the ratio of said second impedance to said first impedance equals the ratio of said third impedance to the impedance of said signal source, and in which the ganging of said taps is such as to maintain the ratio of impedances on either side of the tap on said second impedance equal to the ratio of impedances on either side of the tap on said first impedance.

3. An amplifier having an input terminal, an output terminal and a common terminal; a signal level adjusting potentiometer comprising a first impedance element and an adjustable tap thereon, said first impedance element being connected across a source of signal voltage and having one end connected to said common terminal; a connection from said adjustable tap through a second impedance to said input terminal; a feedback circuit containing a third impedance connected between said output and input terminals; and means for making the fraction of the voltage at said output terminal fed back to said input terminal independent of the position of said tap, said means comprising: a two-terminal network connected in said feedback circuit in series with said third impedance, said network comprising a fourth impedance element having the same ratio to said first impedance element that said third impedance has to said second impedance, said fourth impedance element having an adjustable tap connected to one of said network terminals, one end of said fourth impedance element being connected to the other network terminal, and the other end of said fourth impedance element being connected to said other network terminal through a fifth impedance having a ratio to the impedance of said signal source equal to the ratio of said third impedance to said second impedance; and means for ganging the taps of said first and fourth impedance elements for simultaneous adjustment, said ganging being such as to maintain the ratio of impedances on either side of the tap on said fourth impedance element equal to the ratio of impedances on either side of the tap on said first impedance element.

References Cited in the file of this patent

UNITED STATES PATENTS

| | | |
|---|---|---|
| 2,173,426 | Scott | Sept. 19, 1939 |
| 2,233,759 | Werrman | Mar. 4, 1941 |
| 2,253,976 | Guanella | Aug. 26, 1941 |
| 2,632,811 | Souget et al. | Mar. 24, 1953 |